United States Patent
Ghahramani (10) Patent No.: US 10,813,201 B1
(45) Date of Patent: Oct. 20, 2020

(54) MODULAR MOTION-DETECTING LIGHTING SYSTEM

(71) Applicant: Great Home Tek Inc., San Jose, CA (US)

(72) Inventor: Alan Ghahramani, San Jose, CA (US)

(73) Assignee: Great Home Tek, Inc., San Jose, CA (US)

( * ) Notice: Subject to any disclaimer, the term of this patent is extended or adjusted under 35 U.S.C. 154(b) by 0 days.

(21) Appl. No.: 16/680,307

(22) Filed: Nov. 11, 2019

(51) Int. Cl.
| F21V 21/005 | (2006.01) |
| H05B 47/19 | (2020.01) |
| F21V 23/04 | (2006.01) |
| F21S 8/00 | (2006.01) |

(52) U.S. Cl.
CPC ......... H05B 47/19 (2020.01); F21V 23/0442 (2013.01); F21S 8/033 (2013.01)

(58) Field of Classification Search
CPC .. F21V 21/002; F21V 21/005; F21V 23/0442; F21V 23/0471; F21V 23/06; F21S 4/20; F21S 4/28
See application file for complete search history.

(56) References Cited

U.S. PATENT DOCUMENTS

| 5,702,176 | A | * | 12/1997 | Engle | .......... | F21S 2/00 |
| | | | | | | 362/219 |
| 6,536,924 | B2 | * | 3/2003 | Segretto | .......... | F21S 2/005 |
| | | | | | | 362/247 |
| 7,270,443 | B2 | * | 9/2007 | Kurtz | .......... | F21S 8/00 |
| | | | | | | 362/217.05 |
| 7,922,354 | B2 | * | 4/2011 | Everhart | .......... | F21V 23/009 |
| | | | | | | 362/235 |
| 8,912,905 | B2 | * | 12/2014 | Wong | .......... | G06Q 10/063114 |
| | | | | | | 340/572.4 |
| 8,939,634 | B2 | * | 1/2015 | Leadford | .......... | F21V 5/04 |
| | | | | | | 362/647 |
| 9,414,456 | B2 | * | 8/2016 | Wong | .......... | F21V 33/0052 |
| 9,759,391 | B1 | * | 9/2017 | Shew | .......... | F21S 9/022 |
| 9,964,289 | B2 | * | 5/2018 | Pearson | .......... | F21V 21/005 |
| 10,222,052 | B1 | * | 3/2019 | Ter-Hovhannisyan | .......... | |
| | | | | | | F21V 21/005 |
| 2007/0274067 | A1 | * | 11/2007 | Sloan | .......... | F21S 4/26 |
| | | | | | | 362/219 |
| 2010/0271804 | A1 | * | 10/2010 | Levine | .......... | F21S 4/20 |
| | | | | | | 362/35 |
| 2016/0003456 | A1 | * | 1/2016 | Xu | .......... | F21V 23/003 |
| | | | | | | 362/249.06 |

\* cited by examiner

Primary Examiner — Ismael Negron
(74) Attorney, Agent, or Firm — Patent Ingenuity, P.C.; Samuel K. Simpson (57) ABSTRACT

A motion-detecting lighting system includes a plurality of modular lighting units configured to electrically connect to one another, each modular lighting unit having an enclosure, a light emission window positioned within a first cavity of the enclosure, and a plurality of light emitting diodes positioned within the enclosure. One of the modular lighting units further includes at least one motion sensor protruding through a second cavity of the enclosure to detect motion of a user, and a processor that receives data from the motion sensor and generates a command to turn the light emitting diodes ON/OFF based on the motion of the user.

20 Claims, 13 Drawing Sheets

MODULAR MOTION-DETECTING LIGHTING SYSTEM

BACKGROUND

1. Field

This disclosure generally relates to lighting systems. More particularly, the disclosure relates to motion-detected lighting systems.

2. General Background

Lighting systems are often necessary to help ensure the safety of the occupants of a home. For example, at night, lighting systems allow occupants to move about the home from room to room with minimal concern regarding stumbling over, or colliding with, objects.

However, installation of a lighting system is often a daunting task. In particular, lighting systems often come in predefined lengths that may or may not fit within a desired area for installation (e.g., underneath a kitchen cabinet). Further, even if the lighting system does fit within the desired area, it may not span the entirety of the intended area to be lit. In essence, home occupants are left with attempting to retrofit lighting systems of predefined measurements into preexisting homes that may not be capable of accommodating an optimal, or possibly any, fit.

As a result, many current home lighting configurations have inadequate lighting to ensure the safety of the home's occupants.

SUMMARY

In one embodiment, a motion-detected lighting system has a primary modular lighting unit having a first enclosure. Furthermore, the primary modular lighting unit has a first light emission window that is positioned within a first cavity of the first enclosure. Additionally, the primary modular lighting unit has a first plurality of light emitting diodes ("LEDs") that are positioned within the first enclosure. Also, the primary modular lighting unit has at least one motion sensor that protrudes through a second cavity of the first enclosure. Finally, the primary modular lighting unit has a processor positioned within the first enclosure that detects motion of a user based on data received from the at least one motion sensor and generates a command to emit light based on the motion of the user. The first plurality of LEDs receives the command and emits a first light emission based on the command.

The motion-detected lighting system also has an extender modular lighting unit, which has a second enclosure. Furthermore, the extender modular lighting unit has a second light emission window that is positioned within a first cavity of the second enclosure. Additionally, the extender modular lighting unit has a second plurality of LEDs that are positioned within the second enclosure. The second plurality of LEDs receives the command and emits a second light emission, simultaneously with the first light emission, based on the command.

In another embodiment, a motion-detected lighting system has the foregoing primary modular lighting unit and the foregoing extender modular lighting unit. Additionally, the motion-detected lighting system has one more receptacles that adhere to an object in a physical environment. The primary modular lighting unit has one or more first connectors that adhere at least a portion of the first enclosure to one or more undersides of the one or more receptacles. Further, the extender modular lighting unit has one or more second connectors that adhere at least a portion of the second enclosure to the one or more undersides of the one or more receptacles.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A modular motion-detected lighting system is provided to allow for multiple lighting units to be adhered to one another in a configuration that meets the sizing requirements of a particular object within a physical environment. In essence, a user may select as many units as desired for attachment along a linear path for adherence to an object (kitchen cabinet, staircase railing, shelves, mirrors, etc.). As an example, the modular motion-detected lighting units may be adhered to one another via one or more magnetic connectors, allowing for easy installation and removal. Rather than being tied to a particular lighting installation, the modular motion-detected lighting system allows users to seamlessly move modular units from room-to-room and essentially snap units in place (e.g., via magnetic connection). Furthermore, the modular motion-detected lighting system may have one or more receptacles that adhere the modular motion-detected lighting units to the object. The receptacle(s) may be adhered (e.g., adhesive such as double-sided tape or glue, magnets, clips, etc.) to the intended location via tool-less installation (i.e., without a hammer or screwdriver). (Alternatively, screws, bolts, pins, nails, etc. may be used to adhere the receptacle(s) to the intended location.) For example, the modular motion-detected lighting system is easy-to-install on the underside of a number of different objects (e.g., kitchen cabinets, staircase rail, shelves, mirrors, etc.).

To maximize efficiency, the modular motion-detected lighting system may have a primary modular lighting unit and one or more extender modular lighting units. The primary modular lighting unit may be responsible for having certain componentry that performs operations for the modular motion-detected lighting system, whereas the one or more extender modular lighting units may have less componentry, and rely on the primary modular lighting unit for performing certain functionality for the overall modular-detected lighting system.

Additionally, in one embodiment, the modular motion-detected lighting system may utilize light emitters (e.g., LEDs) that emit light less brightly than standard light bulbs. In contrast with the use of standard light bulbs at night, whereby many users' eyes have to adjust to significant light intensity, the modular motion-detected lighting system may utilize LEDs, which emit light in a more comforting way to the eyes of the user. In essence, the modular motion-detected lighting system removes the physical coupling between a light bulb and a switch, which is present in many typical configurations.

Figure 1A:
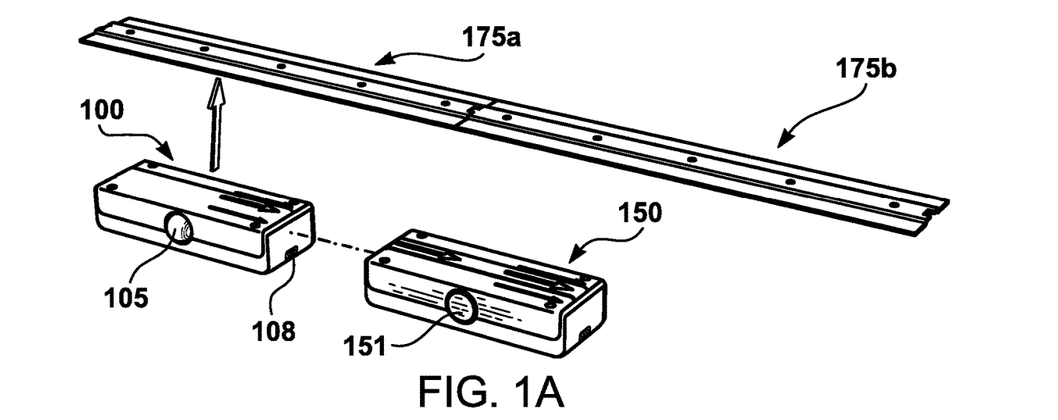
FIG. 1A illustrates a front, side perspective view of a primary modular lighting unit and an extender modular lighting unit, detached from each other and detached from a plurality of receptacles.

FIGS. 1A-1D illustrate side perspective views of a modular motion-detected lighting system 100. In particular, FIG. 1A illustrates a front, side perspective view of a primary modular lighting unit 100 and an extender modular lighting unit 150, detached from each other and detached from a plurality of receptacles 175a and 175b. The primary modular lighting unit 100 may have a connector 108, as illustrated by a side perspective view in FIG. 1C, positioned within the primary modular lighting unit 100 that connects to a receiver 109, as illustrated by a side perspective view in FIG. 1D, positioned within the extender modular lighting unit 151. In one embodiment, the connector 108 and the receiver 109 encompass one or more magnets that adhere the primary modular lighting unit 100 and the extender modular lighting unit 150 to one another. (Alternatively, the primary modular lighting unit 100 may have the receiver 109, and the extender modular lighting unit 150 may have the connector 108.) In another embodiment, a different type of connection mechanism (e.g., one or more clips), may be utilized to adhere the primary modular lighting unit 100 and the extender modular lighting unit 151 to one another.

The connector 108 and the receiver 109 may be electronically coupled, when adhered to one another, to allow for the transmission of electrical charge from the primary modular lighting unit 100 to the extender modular lighting unit 150. Accordingly, in one embodiment, the primary modular lighting unit 100 may be responsible for generating electricity (e.g., via an internal battery, connection to an external A/C adapter, etc.), thereby alleviating the extender modular lighting unit 150 of the responsibility for generating electricity.

Furthermore, in one embodiment, the primary modular lighting unit 100 may be responsible for performing motion detection for the modular motion-detected lighting system, thereby alleviating the extender modular lighting unit 150 of that responsibility. For example, the primary modular lighting unit 100 may have a motion sensor 105, which includes a geometrically-shaped casing that surrounds a motion sensing element (e.g., an infrared ("IR") sensor that is able to detect movement in the dark). For example, the casing may be a spherical, or semi-spherical (i.e., substantially spherical), shape. By having such a shape, the casing allows for a field of view that provides significant detection of movement. For instance, the motion sensor 105 may detect motion within a field of view of approximately one hundred eighty degrees from the motion sensor 105. (Other fields of view, which are lesser or greater than this example, may be obtained based on different geometrical shapes of the casing.) By way of contrast, the extender modular lighting unit 150 may be configured to not have any motion sensor. For example, the extender modular lighting unit 150 may have a non-motion sensing element 151 that is positioned within a cavity that could be filled with the motion sensor. In other words, both the primary modular lighting unit 100 and the extender modular lighting unit 150 may be fabricated from the same shell, but the motion sensor 105 may be implemented for the primary modular lighting unit 100, whereas the non-motion sensing element 151 may be implemented for the extender modular lighting unit 150. In another embodiment, different shells may be utilized for the primary modular lighting unit 100 and the extender modular lighting unit 150. For example, the extender modular lighting unit 150 may have a continuous outer wall, without any cavity for a non-motion sensing element 151.

In one embodiment, the receptacles 175a and 175b are also modular. For example, two modular lighting units may fit on the receptacle 175a, thereby necessitating an additional receptacle 175b for additional modular lighting units. In another embodiment, the receptacle 175a is not modular.

Figure 1B:
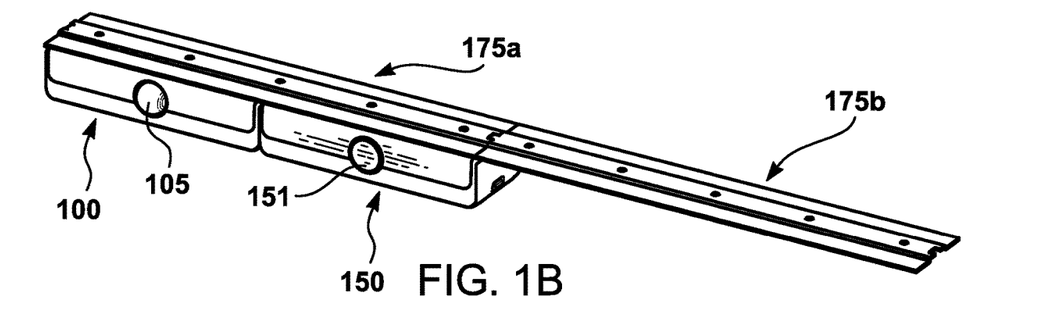
FIG. 1B illustrates the primary modular lighting unit and the extender modular lighting unit being adhered to one another, and being adhered to the receptacle.
Figure 1C:
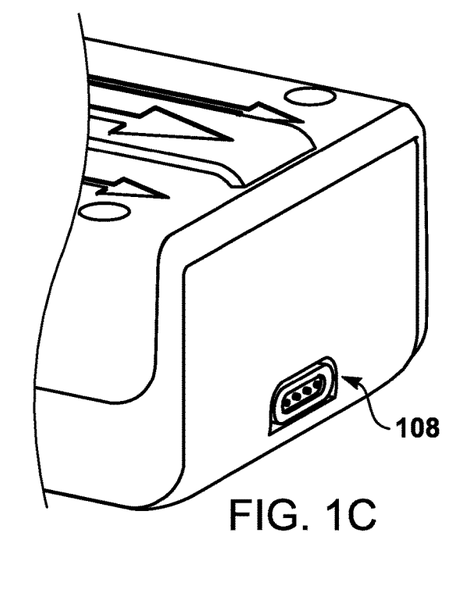
FIG. 1C illustrates a side perspective view of a connector positioned within the primary modular lighting unit.
Figure 1D:
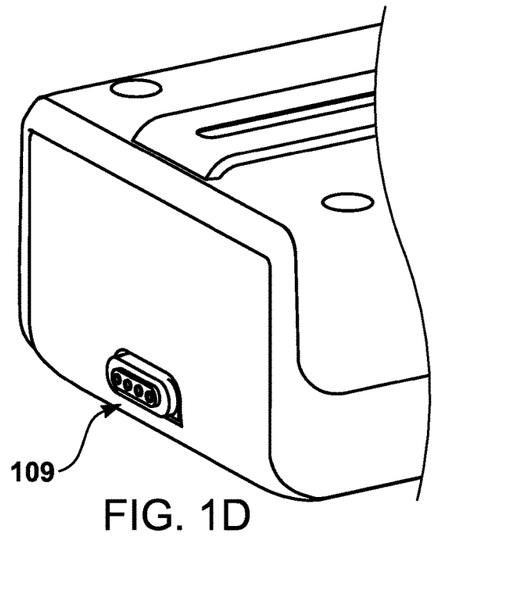
FIG. 1D illustrates a side perspective view of a receiver positioned within the extender modular lighting unit.

Furthermore, FIG. 1B illustrates the primary modular lighting unit 100 and the extender modular lighting unit 150 being adhered to one another, and being adhered to the receptacle 175a. In one embodiment, each of the primary modular lighting unit 100 and the extender modular lighting unit 150 have a plurality of magnets that allow the primary modular lighting unit 100 and the extender modular lighting unit 150 to be adhered to one or more of the receptacles 175a and 175b.

Figures 2A, 2B:
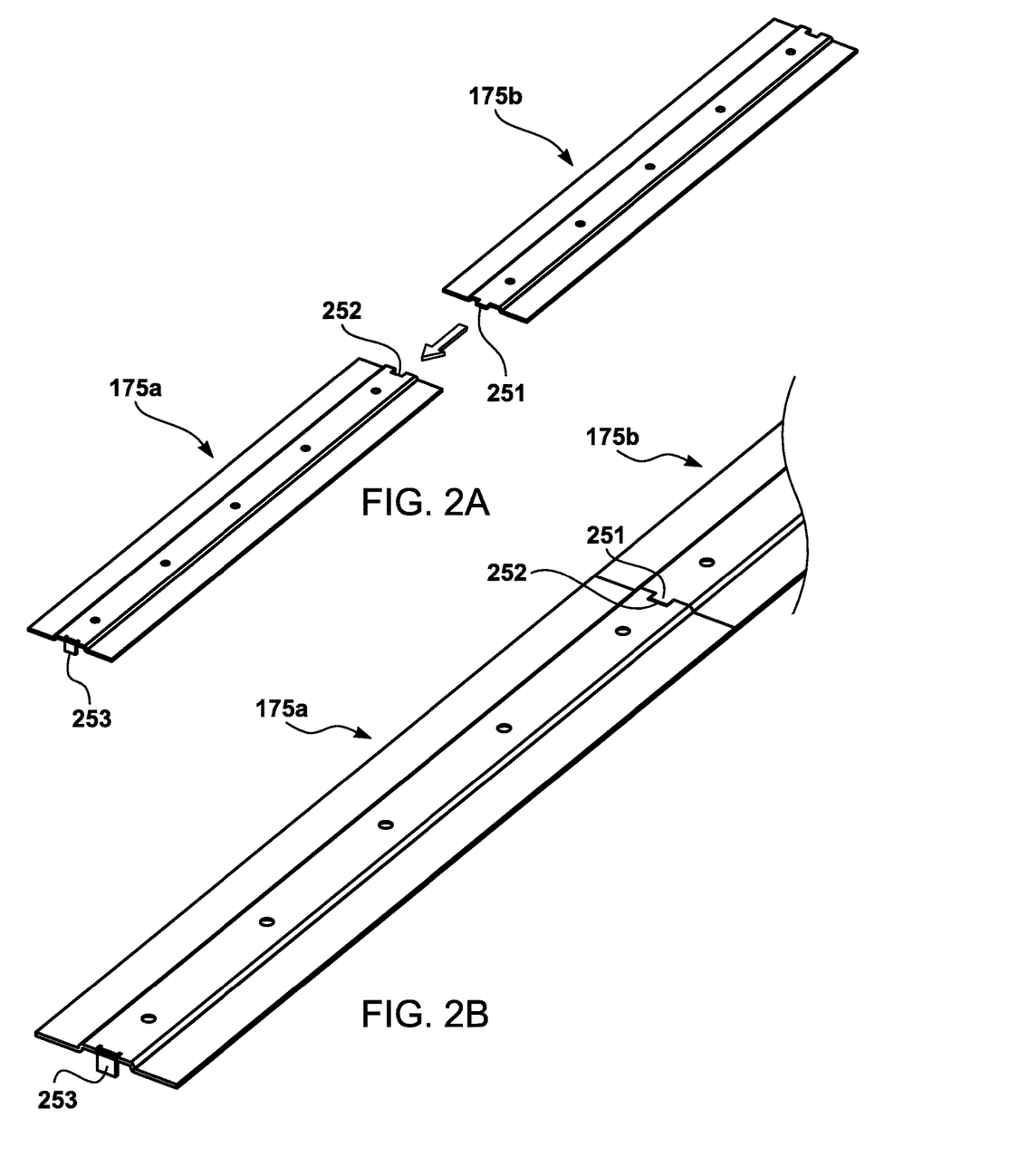
FIG. 2A illustrates a top perspective view of the receptacles detached from one another.
FIG. 2B illustrates the receptacles adhered to one another.

FIGS. 2A and 2B illustrate top perspective views of the receptacles 175a and 175c illustrated in FIGS. 1A and 1B. In particular, FIG. 2A illustrates a top perspective view of the receptacles 175a and 175b detached from one another. In one embodiment, the receptacle 175a has a receiver 252 that receives a connector 251 of the receptacle 175b. For example, the receiver 252 and the connector 251 may encompass one or magnets that allow for magnetic adherence between the receptacles 175a and 175b. Alternatively, other types of connection mechanisms (e.g., clips) may be used to adhere the receptacles 175a and 175b to one another. Furthermore, the receptacle 175a may have a stopper 253 that indicates an end portion of the receptacle 175a. FIG. 2B illustrates the receptacles 175a and 175b adhered to one another.

Figure 3A:
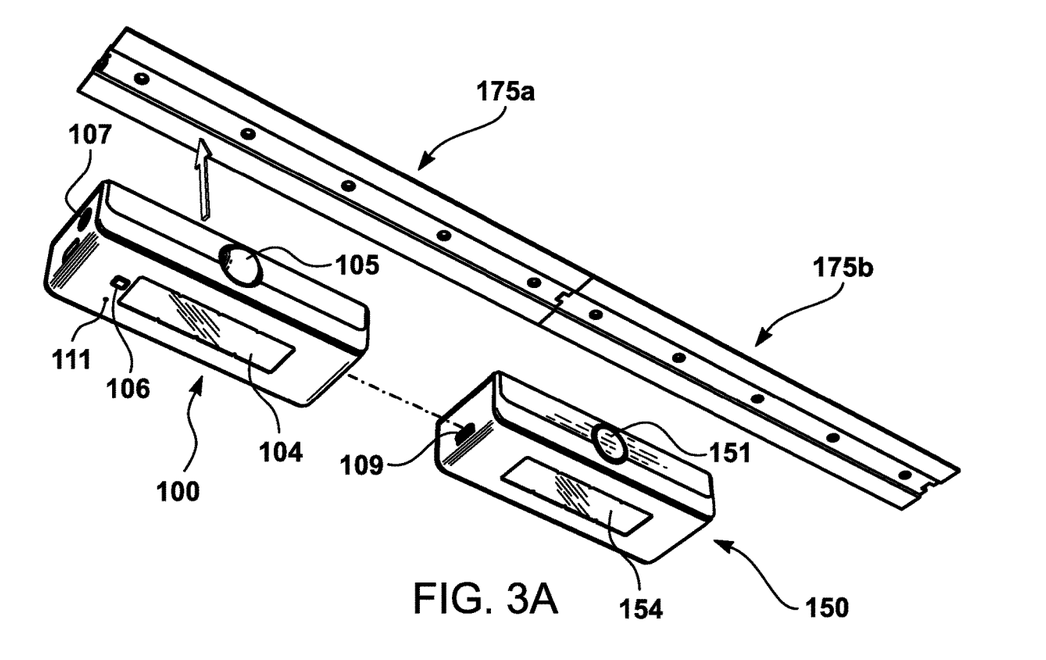
FIG. 3A illustrates an underside perspective view of the primary modular lighting unit and the extender modular lighting unit detached from one another, and detached from the receptacles.
Figure 3B:
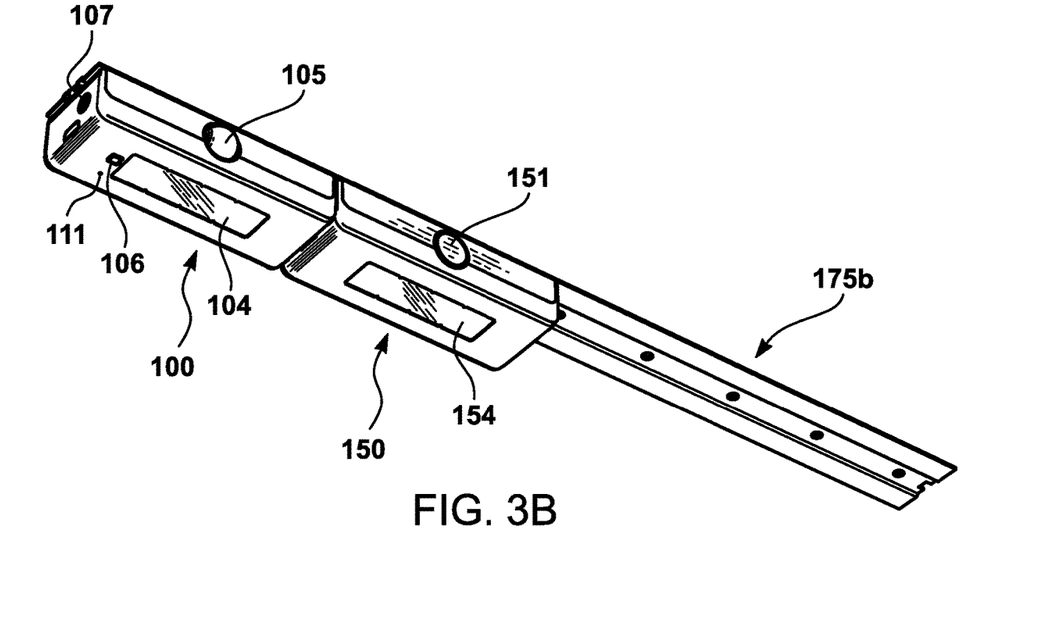
FIG. 3B illustrates an underside perspective view of the primary modular lighting unit and the extender modular lighting unit attached to one another, and attached to the receptacles.

Furthermore, FIGS. 3A and 3B illustrate underside perspective views of the receptacles 175a and 175b, in addition to underside perspective view of the primary modular lighting unit 100 and the extender modular lighting unit 150. In particular, FIG. 3A illustrates an underside perspective view of the primary modular lighting unit 100 and the extender modular lighting unit 150 detached from one another, and detached from the receptacles 175a and 175b. The primary modular lighting unit 100 has a primary light emission window 104, and the extender modular lighting unit 150 has an extender light emission window 154. In one embodiment, the primary light emission window 104 and the extender light emission window 154 have the same, or substantially similar, configurations to allow for a plurality of light emitters (e.g., LEDs) within the modular lighting units to emit light. In another embodiment, the primary light emission window 104 and the extender light emission window 154 have different configurations. FIG. 3B illustrates an underside perspective view of the primary modular lighting unit 100 and the extender modular lighting unit 150 attached to one another, and attached to the receptacles 175a and 175b.

The primary modular lighting unit 100 may also have an activator 106 that, when activated (e.g., pressed, swiped, tapped, etc.), initiates light emission from the one or more light emitters of either, or both, of the primary modular lighting unit 100 and the extender modular lighting unit 150. Furthermore, the activator 106 may also allow for changing the colors emitted by the one or more light emitters. For instance, the user may press the activator 106 with a tap to turn the light emitters on, and hold the activator 106 for a predetermined amount of time (e.g., four seconds) to enter a color configuration mode in which the color of the light emitted by the light emitters may be modified. For example, the user may be able to view the color emitted by the light emitters through the primary light emission window 104 and/or the extender light emission window 154, and cycle through the different color options via inputs to the activator 106 (e.g., taps) until the desired color is reached. In one embodiment, the user uses the activator 106 to modify all of the light emitted by the light emitters based on a single color. In an alternative embodiment, the user uses the activator 106 to modify the light emitted by the light emitters to emit different colors. Accordingly, the activator 106 positioned on the primary modular lighting unit 100 may control the lighting for the entire modular motion-detected lighting system, including the extender modular lighting unit 150, which may not have an activator 106. Furthermore, the primary modular lighting unit 100 may have a battery supply connector 107 that connects to an external A/C adaptor.

The receptacles 175a and 175b may adhered to, partially enclose, or fully enclose the primary modular lighting unit 100 and the extender modular lighting unit 150. Alternatively, the primary modular lighting unit 100 and the extender modular lighting unit 150 may be connected directly to the underside of an object (e.g., cabinet, staircase rail, shelf, etc.) without use of the receptacles 175a and 175b.

Figure 4A:
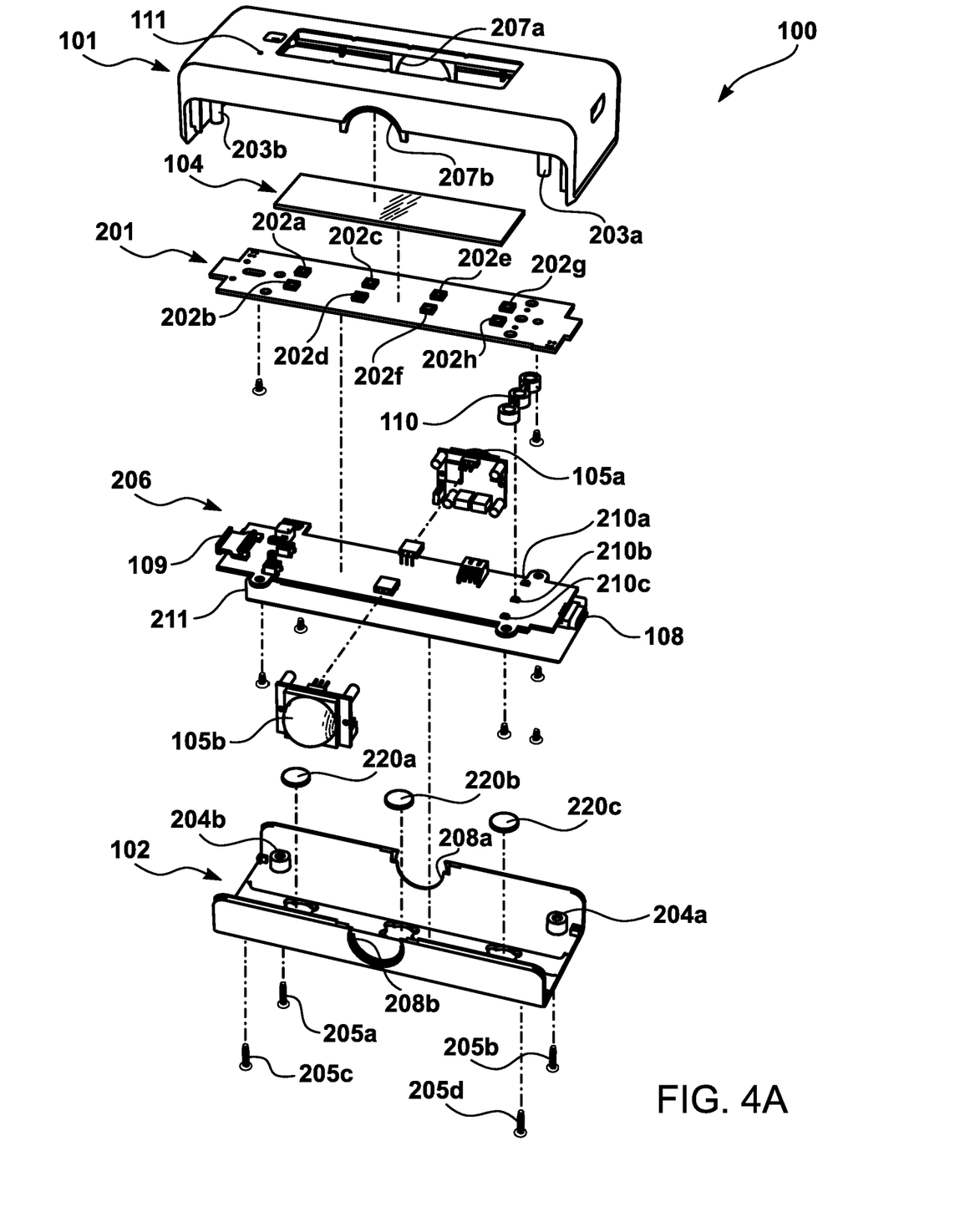
FIG. 4A illustrates a disassembled view of the primary modular lighting unit.
Figure 4B:
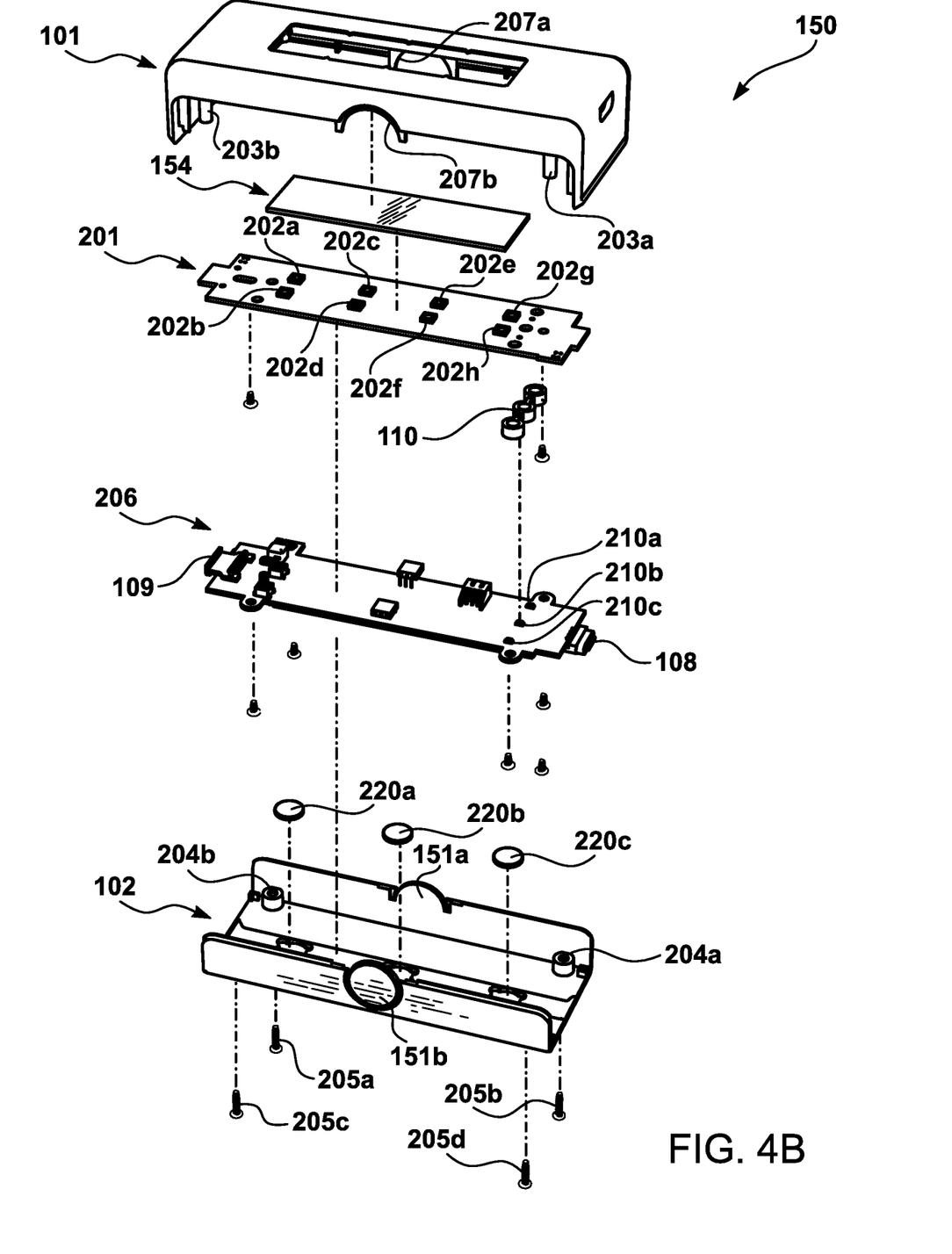
FIG. 4B illustrates a disassembled view of the extender modular lighting unit.

Furthermore, FIGS. 4A and 4B illustrate disassembled views of the primary modular lighting unit 100 and the extender modular lighting unit 150. In particular, FIG. 4A illustrates a disassembled view of the primary modular lighting unit 100. A first enclosure section 101 may have a plurality of first enclosure receivers 203a and 203b that receive one or more connectors 205a-d (e.g., screws, bolts, etc.) through one or more second enclosure receivers 204a and 204b. Furthermore, the primary modular lighting unit 100 may have a plurality printed circuit boards ("PCBs") positioned within the primary modular lighting unit 100. For example, the primary modular lighting unit 100 may have an LED board 201 on which a plurality of LEDs 202a-h are situated. The light emission window 104 may be positioned on top of the LED board 201.

Furthermore, the primary modular lighting unit 100 may have a processor board 206 on which various processors may be situated for operation of the primary modular lighting unit 100 and/or extender modular lighting units 150. Additionally, the primary modular lighting unit 100 may have one or more first enclosure cavities 207a and 207b through which a portion of motion sensors 105a and 105b, as an example, may protrude, respectively. In other words, the primary modular lighting unit 100 may have multiple motion sensors. In essence, the primary modular lighting unit 100 may be a dual bi-directional forward facing motion-detected lighting apparatus that allows for motion detection within a three hundred sixty degree field of view. (Alternatively, more than two motion sensors may also be utilized.) Similarly, the primary modular lighting unit 100 may have one or more second enclosure cavities 208a and 208b through which another portion of the motion sensors 105a and 105b may protrude, respectively. Additionally, the primary modular lighting unit 100 may have positioned therein one or more magnets 220a-c for adherence to the one or more receptacles 175a and 175b illustrated in FIGS. 2A and 2B. (Other types of connectors may be utilized instead.)

Furthermore, the primary modular lighting unit 100 may have a battery supply connector 107 that charges a battery 211. As an example, the primary modular lighting unit 100 may be positioned underneath a kitchen cabinet, and be plugged into a wall outlet with an A/C adapter via the battery supply connector 107, thereby providing electricity, via electrical connectivity, throughout the modular motion-detected lighting system. Alternatively, the primary modular lighting unit 100 may be powered via an internal battery supply that is positioned within the primary modular lighting unit 100. For example, an internal rechargeable battery may be used within the primary modular lighting unit 100 to avoid having to have external wires/cables.

Optionally, the primary modular lighting unit 100 may have additional LEDs 210a-c that emit light through a light guide 110 toward the top surface of the primary modular lighting unit 100. For example, the top surface may be translucent. The additional LEDs may then emit light that is visible through the top surface from the exterior of the primary modular lighting unit 100. For instance, the additional LEDs 210a-c may be configured to emit light of a particular color(s) that is visible to a user through the top surface of the primary modular lighting unit 100.

As another option, the primary modular lighting unit 100 may have an empty cavity for the receiver 109, or connector 108, to prevent connection of modular extender lighting units from one side of the primary modular lighting unit 100.

As a result, the flow of electricity may be controlled to move in one direction from the primary modular lighting unit 100 linearly through extender modular lighting units 150.

As yet another option, the primary modular lighting unit 100 may have a reset activator 111.

FIG. 4B illustrates a disassembled view of the extender modular lighting unit 150. In essence, the extender modular lighting unit 150 may have the light emitter componentry of the primary modular lighting unit 100, illustrated in FIG. 4A, without the corresponding processing and power supply componentry. Alternatively, the extender modular lighting unit 150 may have these components as well. In place of the motion sensors 105a and 105b, the extender modular lighting unit 150 may have the non-motion sensing elements 151a and 151b.

Figure 5A:
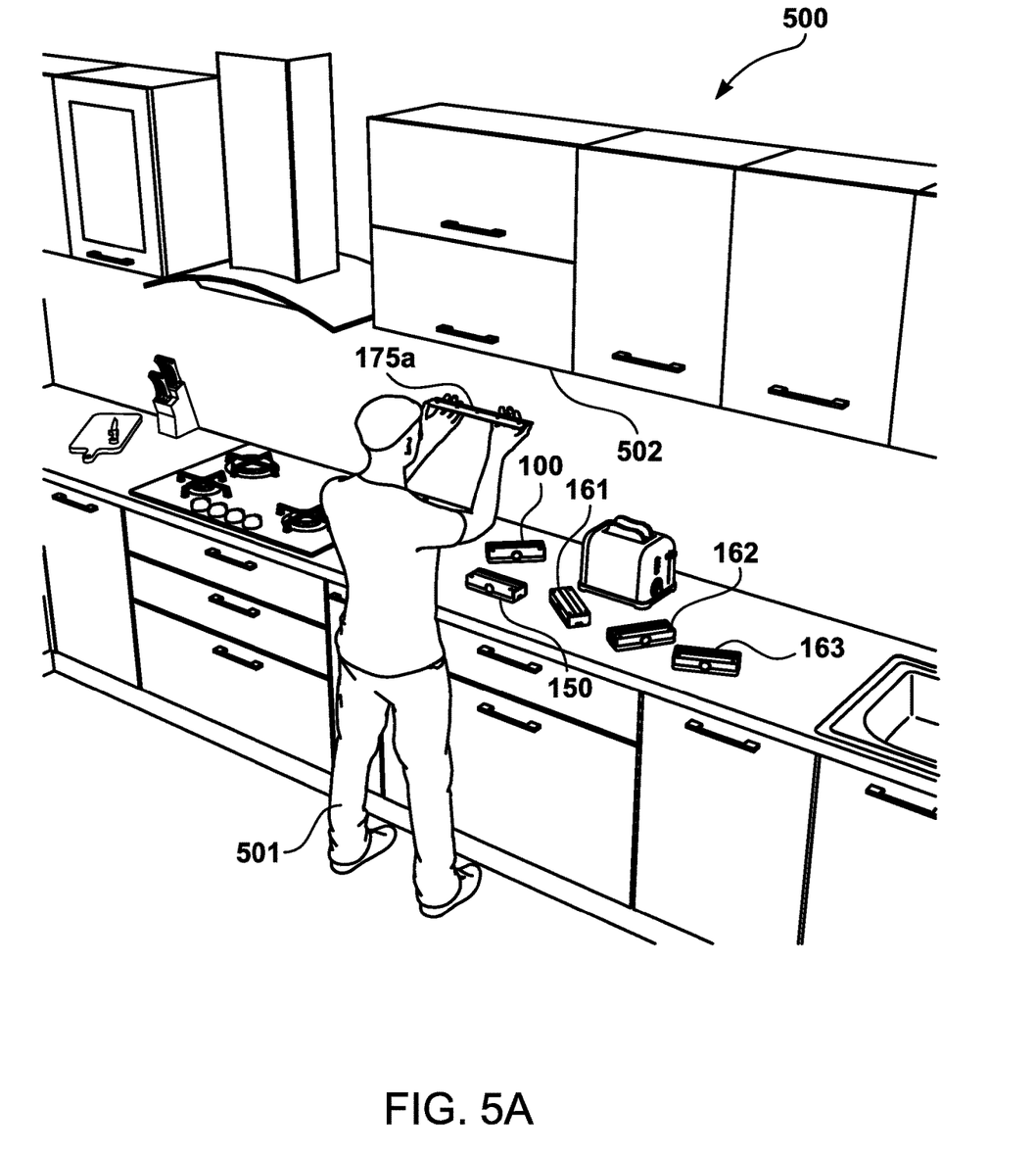
FIG. 5A illustrates the user performing a tool-less installation of the receptacles on the underside portion of the kitchen cabinet.
Figure 5B:
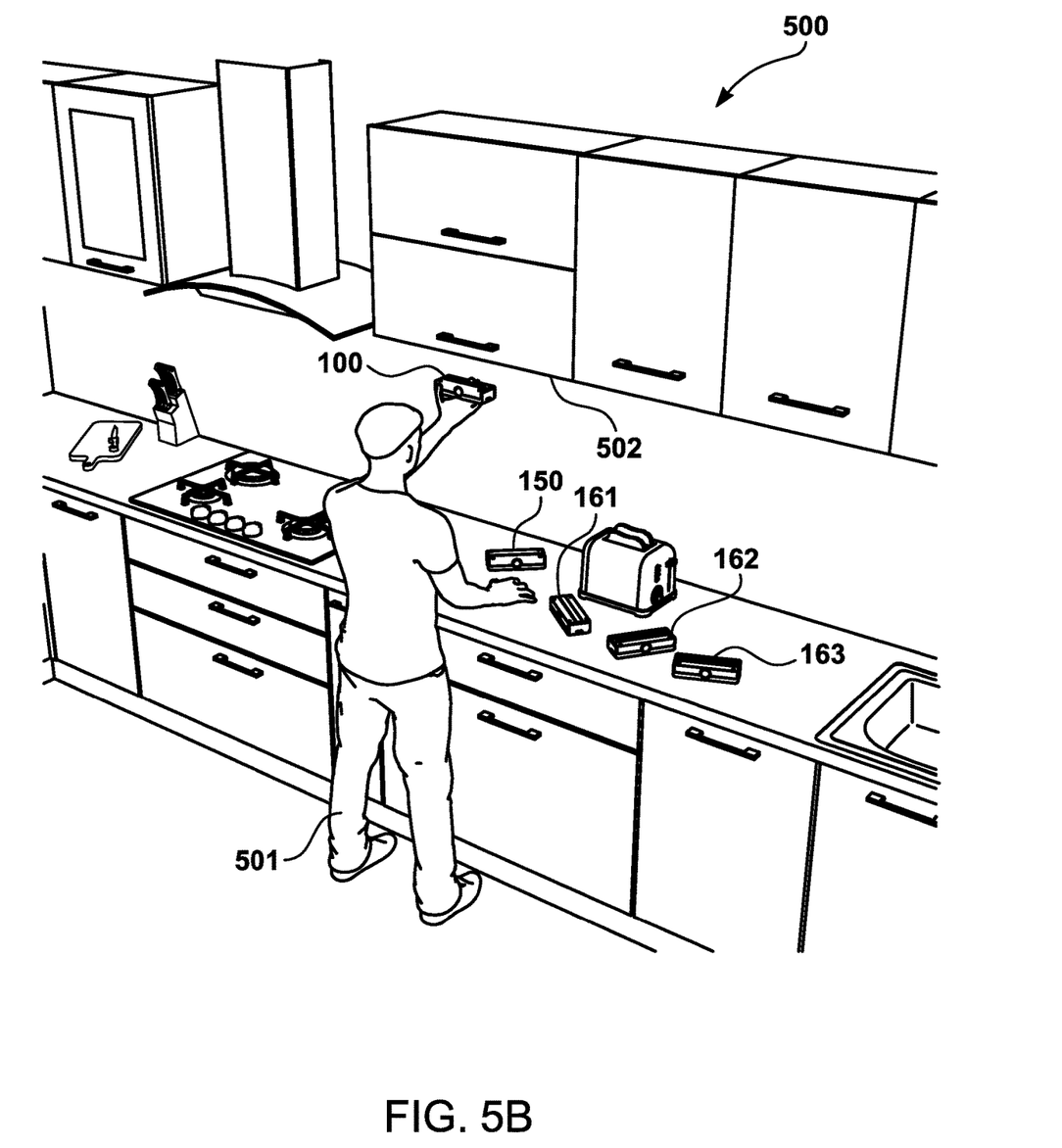
FIG. 5B illustrates the user adhering the primary modular lighting unit to the receptacle.
Figure 5C:
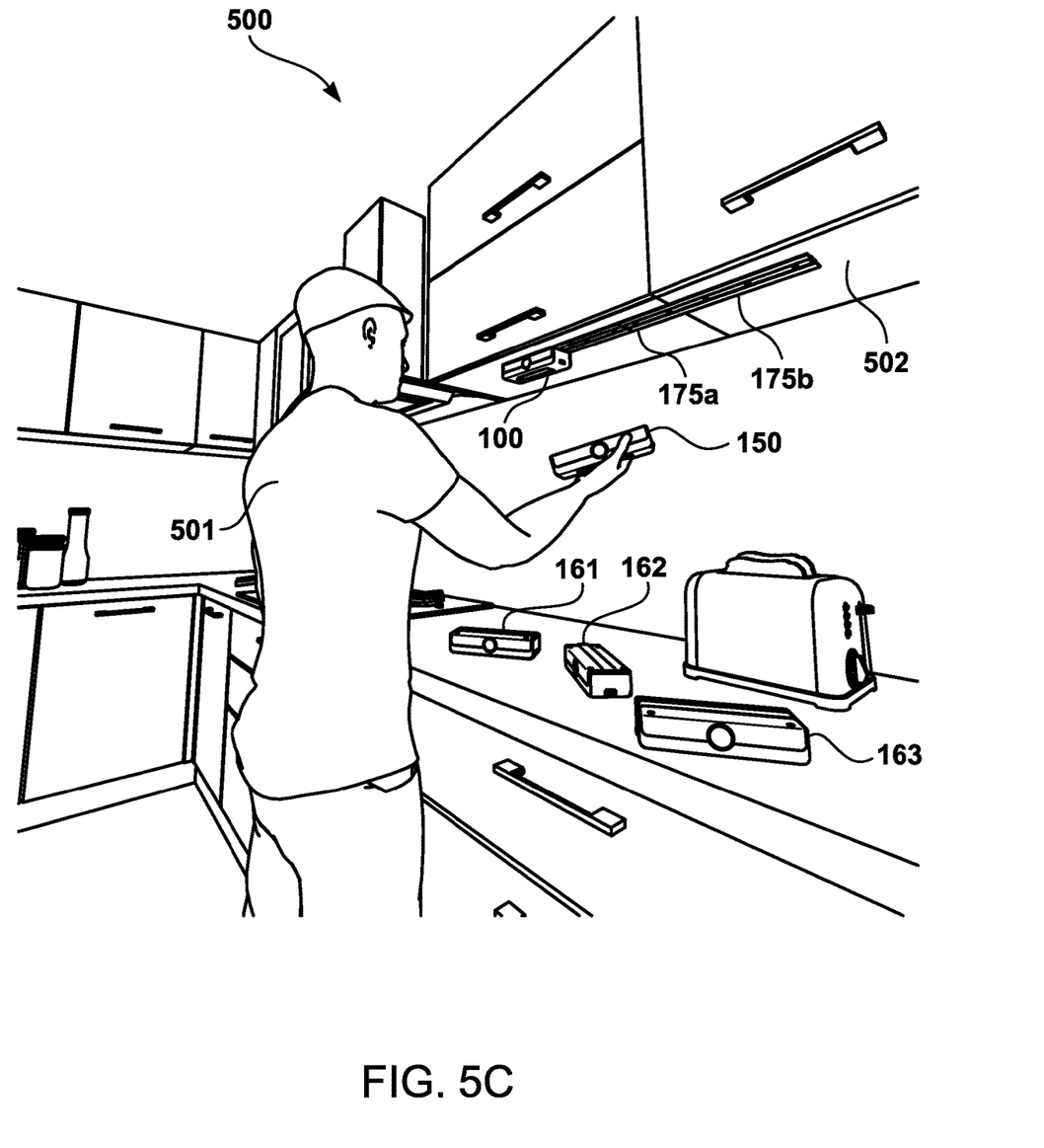
FIG. 5C illustrates the user adhering the extender modular lighting units to the receptacles.

FIGS. 5A, 5B, and 5C illustrate an example of a physical environment 500 in which a user 501 attempts to adhere the receptacles 175a and 175b to an object (e.g., the underside of a kitchen cabinet) within the physical environment 500. In particular, FIG. 5A illustrates the user 501 performing a tool-less installation of the receptacles 175a and 175b on the underside portion of the kitchen cabinet 502. Furthermore, FIG. 5B illustrates the user 501 adhering the primary modular lighting unit 100 to the receptacle 175a. Additionally, FIG. 5C illustrates the user 501 adhering the extender modular lighting units 150, 161, 162, and 163 to the receptacles 175a and 175b. Although only two receptacles 175a and 175b are illustrated, more or less than two receptacles 175a and 175b may be utilized instead. Furthermore, one primary modular lighting unit 100 and four extender modular lighting units 150, 161, 162, and 163 are illustrated as an example, but the user 501 may use a different number of extender modular lighting units in conjunction with the primary modular lighting unit 100.

Figure 6A:
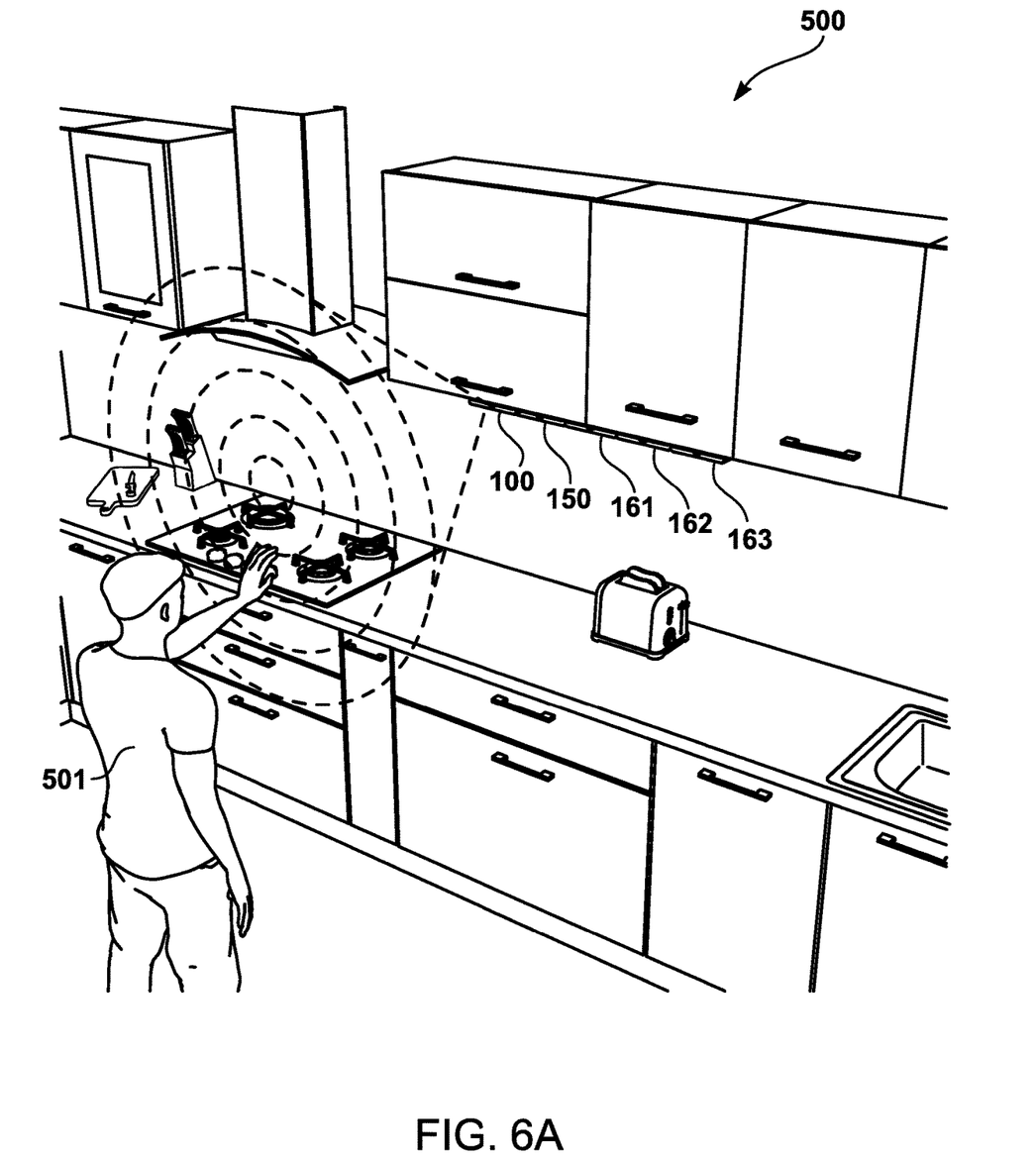
FIG. 6A illustrates the user performing a hand wave motion in front of the primary modular lighting unit.
Figure 6B:
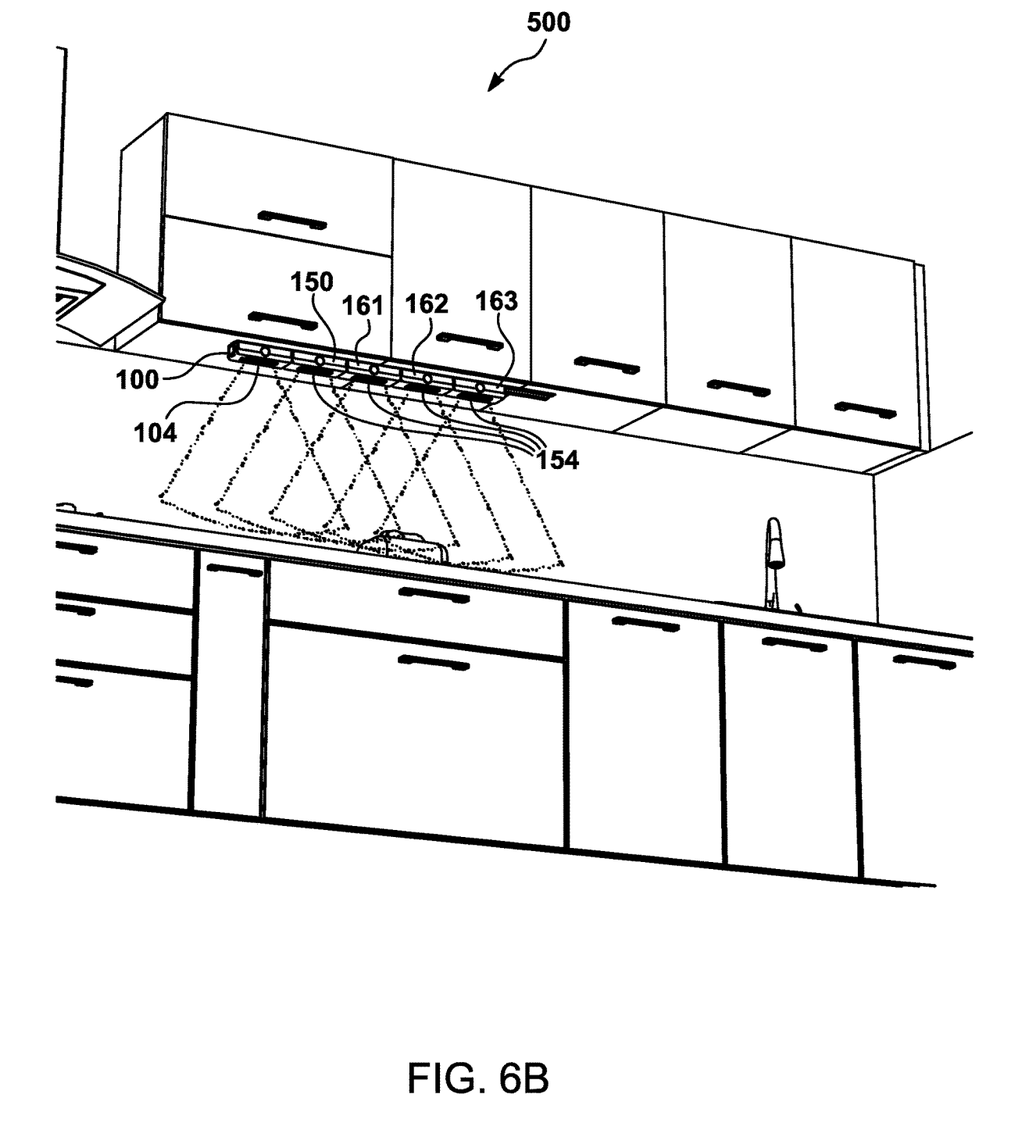
FIG. 6B illustrates the light emitted by the one or more of the plurality of LEDs through the light emission window of the primary modular lighting unit and the light emissions windows of the extender modular lighting units.

Additionally, FIGS. 6A and 6B illustrate the user 501 performing motion that activates the primary modular lighting unit 100 to instruct all of the installed modular lighting units to emit light. In particular, FIG. 6A illustrates the user 501 performing a hand wave motion in front of the primary modular lighting unit 100. The user 501 may be a considerable distance away from the primary modular lighting unit 100, and still may be detected as performing the motion. In one embodiment, any motion may activate emission of light by one or more of the plurality of LEDs 202a-202h illustrated in FIG. 3 from all of the modular lighting units 100, 150, 161, 162, and 163. In another embodiment, at least one of the motion sensors 105a and 105b may be configured to detect only movement according to a predefined pattern. For example, a horizontal hand wave may be necessary to activate light emission if the user 501 wants to avoid light emission being activated based on movement toward the primary modular lighting unit 100. Accordingly, the primary modular lighting unit 100 may be configured to recognize one or more patterns (e.g., via an image capture device that captures movements of the user 501 and a processor that performs image analysis). FIG. 6B illustrates the light emitted by the one or more of the plurality of LEDs 202a-202h through the light emission window 104 of the primary modular lighting unit 100 and the light emissions windows 154 of the extender modular lighting units 150, 161, 162, and 163.

Figure 7:
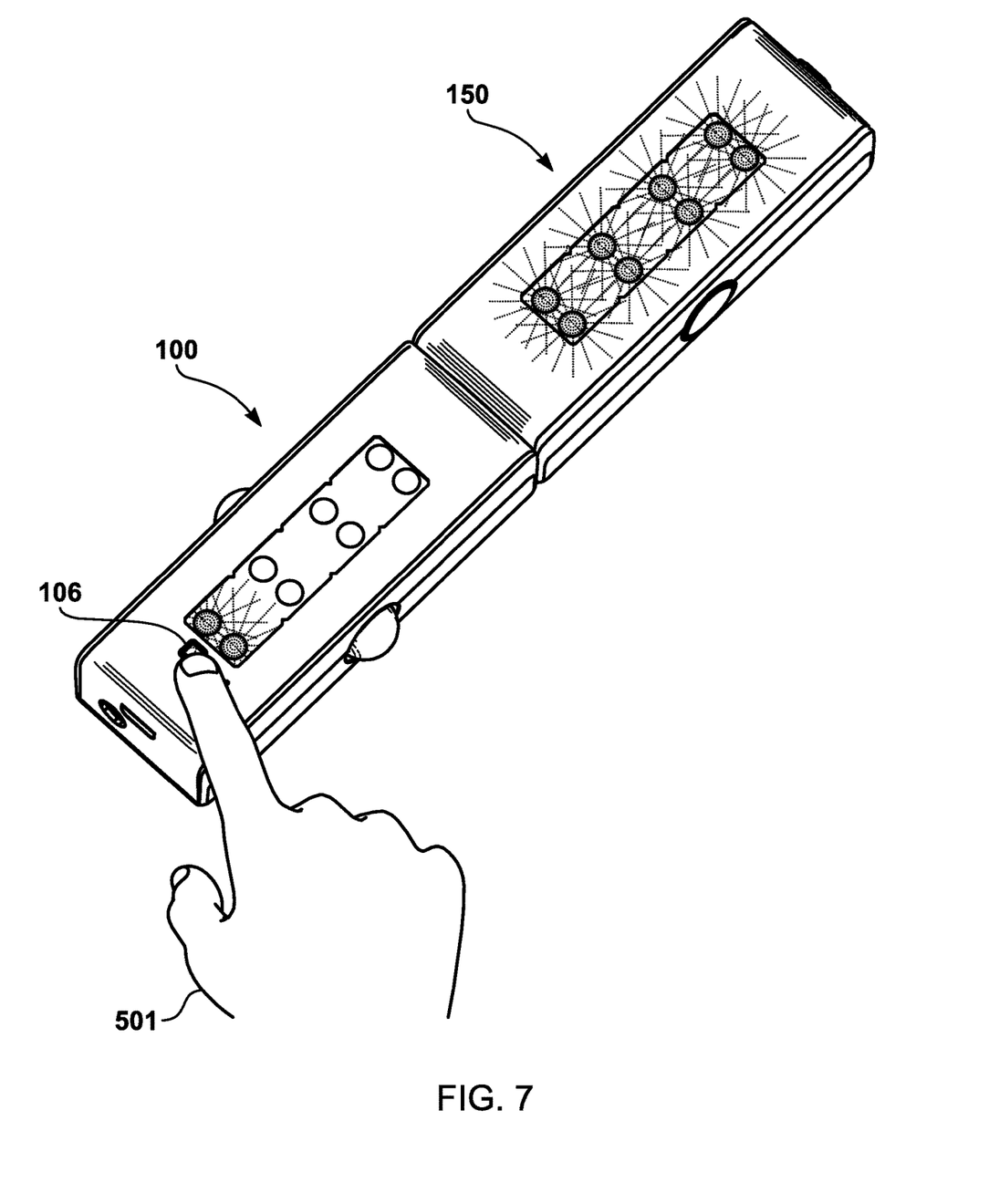
FIG. 7 illustrates the user configuring the primary modular lighting unit via an extender mode.

Additionally, FIG. 7 illustrates the user 501 configuring the primary modular lighting unit 100 via an extender mode. For example, the user 501 may activate (e.g., touch-based input) the activator 106 to enter the extender mode. In essence, the user 501 may indicate to the primary modular lighting unit 100 how many modular units are within the overall modular motion-detected lighting system via a menu. The primary modular lighting unit 100 may display, via a corresponding quantity of light emissions, the quantity of modular lighting units within the modular motion-detected lighting system. For example, the primary modular lighting unit 100 may display two light emissions from two LEDs based on the user 501 indicating that the modular motion-detected lighting system has two modular lighting units: the primary modular lighting unit 100 and the extender modular lighting unit 150.

The user 501 may also press the activator 106 to enter color configuration mode. The user 501 may view the possible colors through the light emission window 104.

Figure 8A:
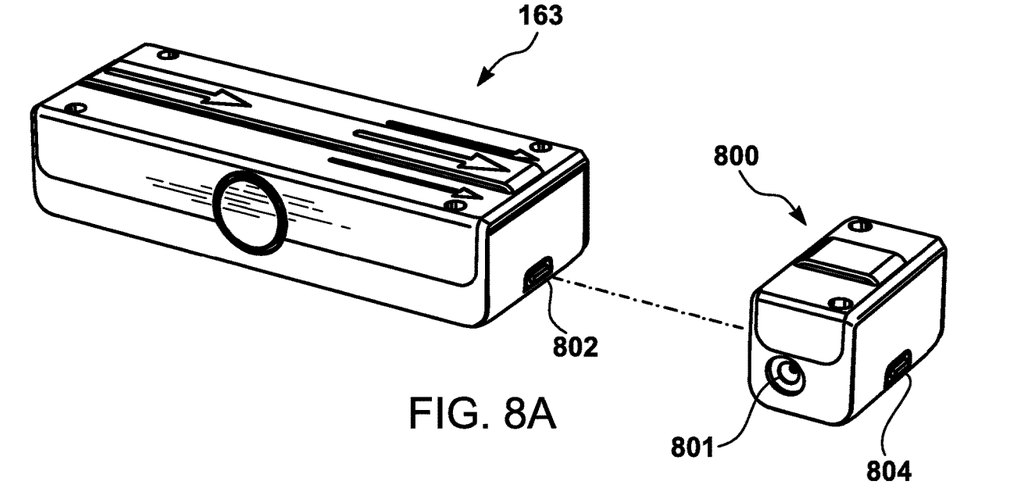
FIG. 8A illustrates a front perspective view of a power injector that may be electrically connected to an extender modular lighting unit to provide additional electrical power to the modular motion-detected lighting system to power additional extender modular lighting units.
Figure 8B:
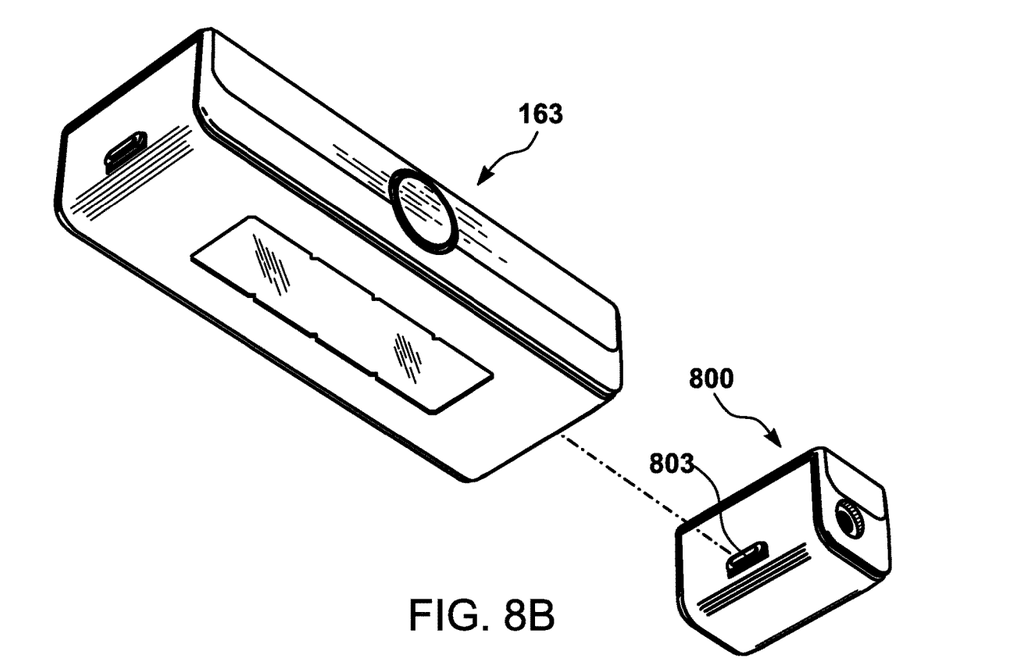
FIG. 8B illustrates an underside perspective view of the power injector and the extender modular lighting unit illustrated in FIG. 8A.

FIGS. 8A and 8B illustrate a power injection configuration to allow the modular motion-detected lighting system to receive electrical power after exceeding a predetermined quantity of modular lighting units. For example, the primary modular lighting unit 100 may be configured to provide only enough electrical power for four extender modular lighting units. FIG. 8A illustrates a front perspective view of a power injector 800 that may be electrically connected to an extender modular lighting unit 163 to provide additional electrical power to the modular motion-detected lighting system to power additional extender modular lighting units. The power injector 800 may have a battery supply connector 801 that connects to an external battery supply. Furthermore, the extender modular lighting unit 163 may have a receiver 802 for electrical connection to the power injector 801. FIG. 8B illustrates an underside perspective view of the power injector 800 and the extender modular lighting unit 163 illustrated in FIG. 8A. The power injector 800 may have a connector 803 for electrical communication with the receiver 802, illustrated in FIG. 8A, of the extender modular lighting unit 163.

Any of the electrical communication described herein may be performed with various types of receivers and/or connectors. For example, the connector 803 illustrated in FIG. 8B may be a receiver, rather than a connector.

Figure 9A:
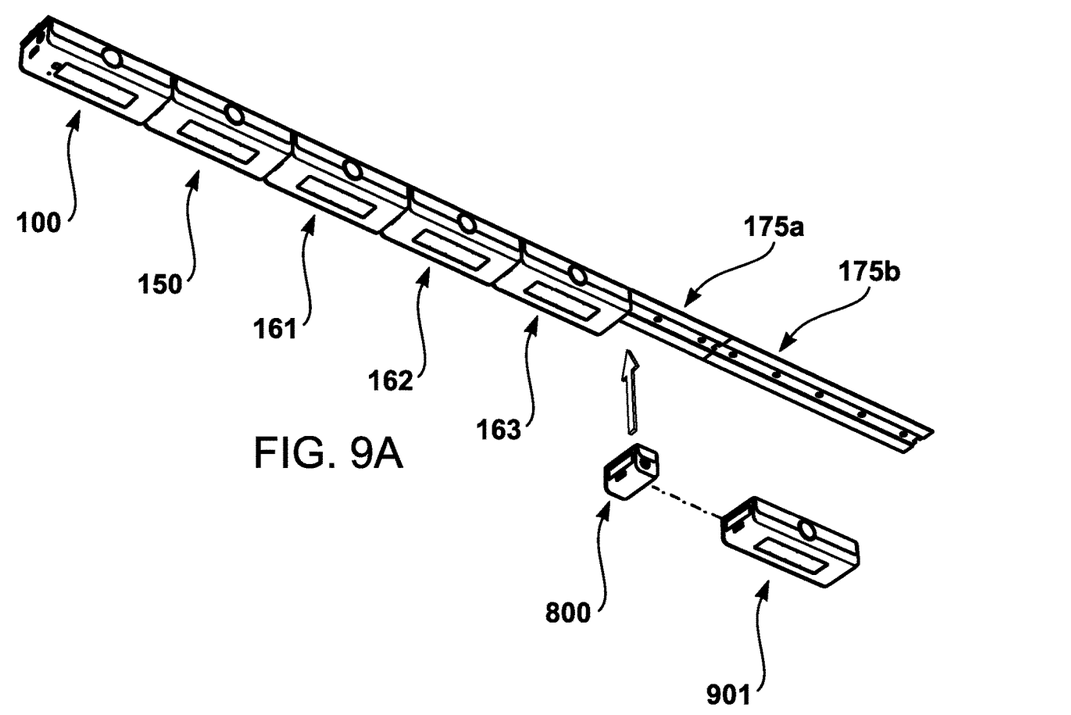
FIG. 9A illustrates the primary modular lighting unit and four extender modular lighting units positioned on one or more receptacles.
Figure 9B:
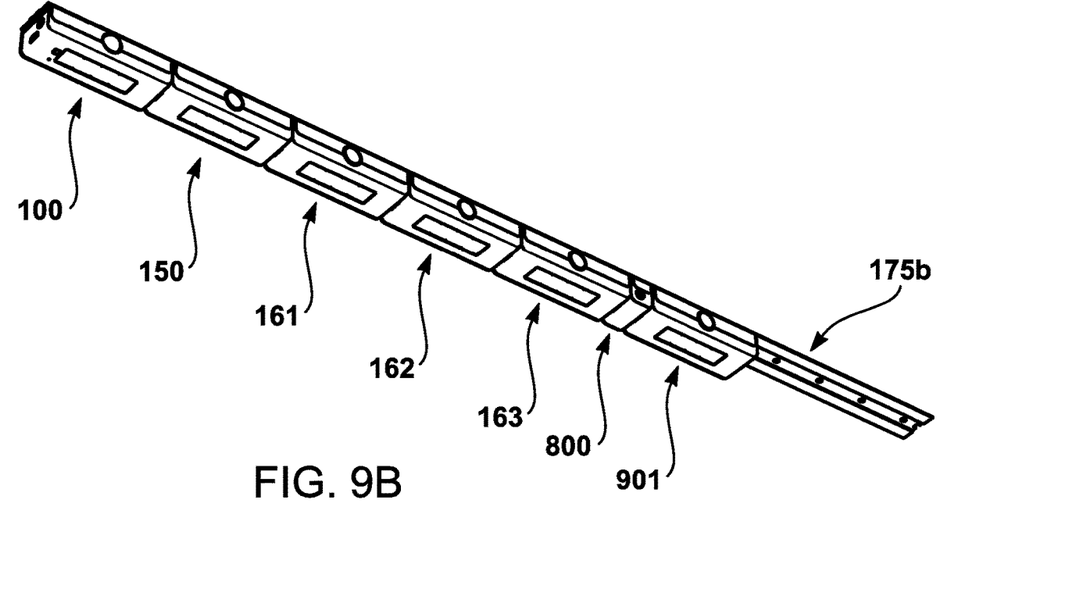
FIG. 9B illustrates the primary modular lighting unit, four extender modular lighting units, the power injector unit, and the additional extender modular lighting unit positioned on the one or more receptacles.

FIGS. 9A and 9B illustrate modular connection of multiple modular lighting units with the power injector 800 illustrated in FIGS. 8A and 8B. In particular, FIG. 9A illustrates the primary modular lighting unit 100 and four extender modular lighting units 150, 161, 162, and 163 positioned on one or more receptacles 175a and 175b. Given the predetermined threshold of five modular lighting units, the user 501 may obtain the power injector 800 to install in between the last extender modular lighting unit 163 and an additional extender modular lighting unit 901. The power injection unit 800 may also have one or more magnets, or other connectors, built-in to adhere the power injector unit 800 to the one or more receptacles 175a and 175b. FIG. 9B illustrates the primary modular lighting unit 100, four extender modular lighting units 150, 161, 162, and 163, power injector unit 800, and additional extender modular lighting unit 901 positioned on one or more receptacles 175a and 175b.

It is understood that the apparatuses and systems described herein may also be applied in other types of apparatuses and systems. Those skilled in the art will appreciate that the various adaptations and modifications of the embodiments of the apparatuses described herein may be configured without departing from the scope and spirit of the present apparatuses. Therefore, it is to be understood that, within the scope of the appended claims, the present apparatuses may be practiced other than as specifically described herein.

I claim:

1. A motion-detecting lighting system comprising:

a primary modular lighting unit having a first enclosure with first and second cavities, a first light emission window positioned within the first cavity, a first plurality of light emitting diodes positioned within the first enclosure, at least one motion sensor protruding through the second cavity, one or more geometrically-shaped casings that surround the at least one motion sensor, and a processor positioned within the first enclosure that detects motion of a user based on data received from the at least one motion sensor and generates a command to emit light based on the motion of the user, the first plurality of light emitting diodes receiving the command and emitting a first light emission based on the command; and a first extender modular lighting unit having a second enclosure with a third cavity, a second light emission window positioned within the third cavity, a second plurality of light emitting diodes that are positioned within the second enclosure, and one or more non-motion sensing elements in a position that corresponds to the one or more geometrically-shaped casings of the primary modular lighting unit, the second plurality of light emitting diodes receiving the command and emitting a second light emission, simultaneously with the first light emission, based on the command.

2. The motion-detecting lighting system of claim 1, the primary modular lighting unit further having a connector; and the first extender modular lighting unit further having a receiver, wherein the connector magnetically attaches to the receiver, the primary modular lighting unit providing the command from the connector to the receiver.

3. The motion-detecting lighting system of claim 1, the primary modular lighting unit further having a receiver; and the first extender modular lighting unit further having a connector, wherein the receiver magnetically attaches to the connector, the primary modular lighting unit providing the command from the receiver to the connector.

4. The motion-detecting lighting system of claim 1, wherein the one or more geometrically-shaped casings are substantially in a shape of a sphere.

5. The motion-detecting lighting system of claim 1, wherein the at least one motion sensor comprises an infrared sensor.

6. The motion-detecting lighting system of claim 1, wherein the primary modular lighting unit has a power supply that provides electrical power to the first extender modular lighting unit.

7. The motion-detecting lighting system of claim 6, further comprising:

a second extender modular lighting unit; and a power injector unit electrically connected in between the first extender modular lighting unit and the second extender modular lighting unit, wherein the first extender modular lighting unit receives electrical power from the primary modular lighting unit and the second extender modular lighting unit receives electrical power from the power injector unit.

8. The motion-detecting lighting system of claim 6, the primary modular lighting unit further having a first activator for receiving a user input that requests electrical power for the primary modular lighting unit and the first extender modular lighting unit without a second activator being positioned on the first extender modular lighting unit;

the primary modular lighting unit further having a receiver; and the first extender modular lighting unit further having a connector, wherein the receiver magnetically attaches to the connector, the primary modular lighting unit providing the command from the receiver to the connector.

9. A motion-detecting lighting system comprising:

a primary modular lighting unit having a first enclosure with first and second cavities, a first light emission window positioned within the first cavity, a first plurality of light emitting diodes positioned within the first enclosure, at least one motion sensor protruding through the second cavity, and a processor positioned within the first enclosure that detects motion of a user based on data received from the at least one motion sensor and generates a command to emit light based on the motion of the user, the first plurality of light emitting diodes receiving the command and emitting a first light emission based on the command, the first plurality of light emitting diodes displaying a menu for indicating a quantity of modular lighting units in operable communication with the primary modular lighting unit; and a first extender modular lighting unit having a second enclosure with a third cavity, a second light emission window positioned within the third cavity, and a second plurality of light emitting diodes that are positioned within the second enclosure, the second plurality of light emitting diodes receiving the command and emitting a second light emission, simultaneously with the first light emission, based on the command.

10. The motion-detecting lighting system of claim 9, the primary modular lighting unit further having a connector; and the first extender modular lighting unit further having a receiver, wherein the connector magnetically attaches to the receiver, the primary modular lighting unit providing the command from the connector to the receiver.

11. The motion-detecting lighting system of claim 9, the primary modular lighting unit further having a receiver; and the first extender modular lighting unit further having a connector, wherein the receiver magnetically attaches to the connector, the primary modular lighting unit providing the command from the receiver to the connector.

12. The motion-detecting lighting system of claim 9, wherein the primary modular lighting unit has a power supply that provides electrical power to the first extender modular lighting unit.

13. The motion-detecting lighting system of claim 12, further comprising:

a second extender modular lighting unit; and a power injector unit electrically connected in between the first extender modular lighting unit and the second extender modular lighting unit, wherein the first extender modular lighting unit receives electrical power from the primary modular lighting unit and the second extender modular lighting unit receives electrical power from the power injector unit.

14. The motion-detecting lighting system of claim 12,
the primary modular lighting unit further having a first activator for receiving a user input that requests electrical power for the primary modular lighting unit and the first extender modular lighting unit without a second activator being positioned on the first extender modular lighting unit.

15. A motion-detecting lighting system comprising:
a primary modular lighting unit having a first enclosure with first and second cavities, a first light emission window positioned within the first cavity, a first plurality of light emitting diodes positioned within the first enclosure, at least one motion sensor protruding through the second cavity, and a processor positioned within the first enclosure that detects motion of a user based on data received from the at least one motion sensor and generates a command to emit light based on the motion of the user, the first plurality of light emitting diodes receiving the command and emitting a first light emission based on the command, the first plurality of light emitting diodes display a menu for a plurality of different colors for the first light emission and the second light emission; and
a first extender modular lighting unit having a second enclosure with a third cavity, a second light emission window positioned within the third cavity, and a second plurality of light emitting diodes that are positioned within the second enclosure, the second plurality of light emitting diodes receiving the command and emitting a second light emission, simultaneously with the first light emission, based on the command.

16. The motion-detecting lighting system of claim 15,
the primary modular lighting unit further having a connector; and
the first extender modular lighting unit further having a receiver,
wherein the connector magnetically attaches to the receiver, the primary modular lighting unit providing the command from the connector to the receiver.

17. The motion-detecting lighting system of claim 15,
the primary modular lighting unit further having a receiver; and
the first extender modular lighting unit further having a connector,
wherein the receiver magnetically attaches to the connector, the primary modular lighting unit providing the command from the receiver to the connector.

18. The motion-detecting lighting system of claim 15, wherein the primary modular lighting unit has a power supply that provides electrical power to the first extender modular lighting unit.

19. The motion-detecting lighting system of claim 18, further comprising:
a second extender modular lighting unit; and
a power injector unit electrically connected in between the first extender modular lighting unit and the second extender modular lighting unit,
wherein the first extender modular lighting unit receives electrical power from the primary modular lighting unit and the second extender modular lighting unit receives electrical power from the power injector unit.

20. The motion-detecting lighting system of claim 18,
the primary modular lighting unit further having a first activator for receiving a user input that requests electrical power for the primary modular lighting unit and the first extender modular lighting unit without a second activator being positioned on the first extender modular lighting unit.

* * * * *